June 30, 1959 R. T. GLASS 2,892,423
CONFECTION MACHINES
Filed July 22, 1957 3 Sheets-Sheet 1

INVENTOR
Robert T. Glass
BY Beale and Jones
ATTORNEYS

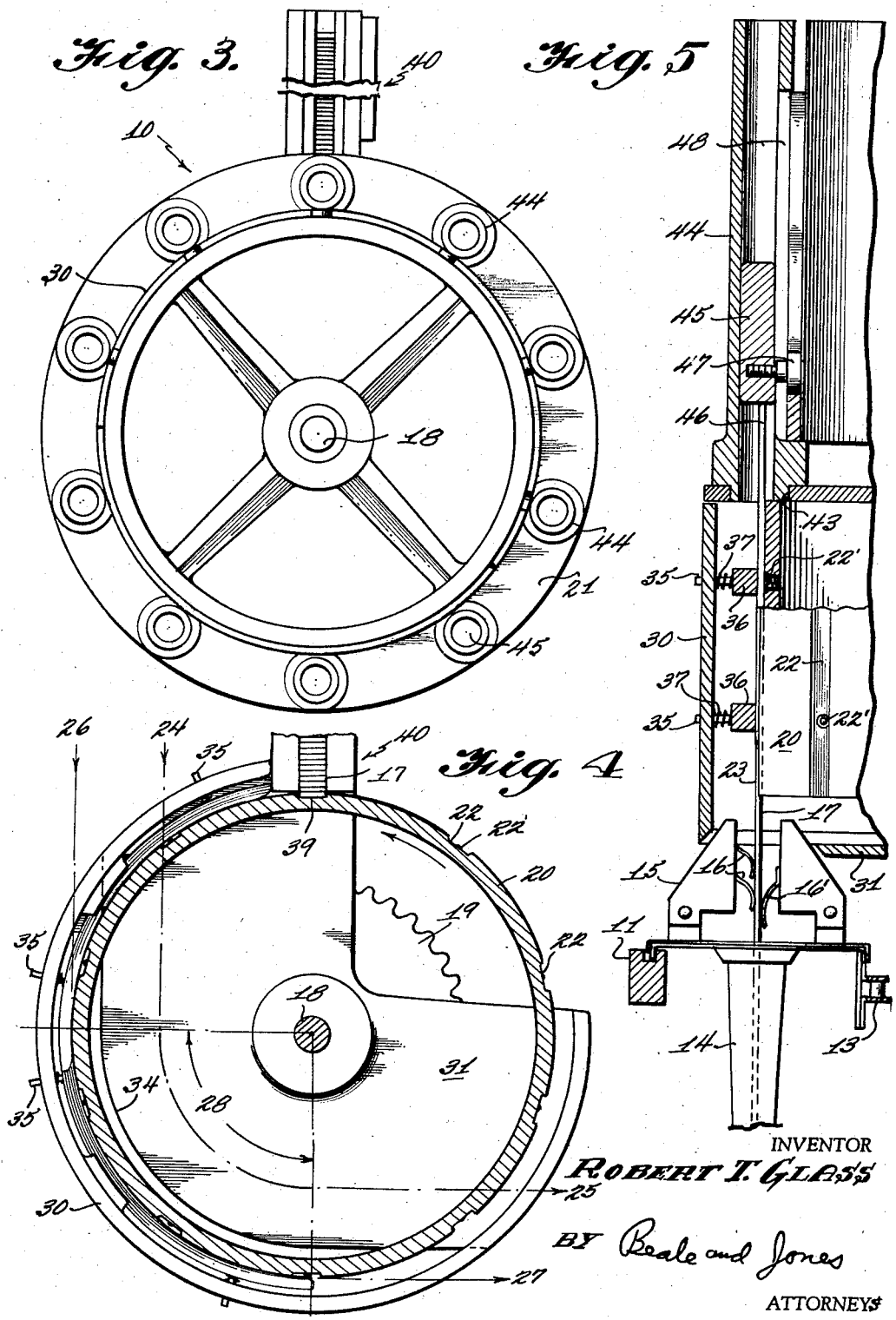

June 30, 1959 — R. T. GLASS — 2,892,423
CONFECTION MACHINES
Filed July 22, 1957 — 3 Sheets-Sheet 3
Fig. 6.
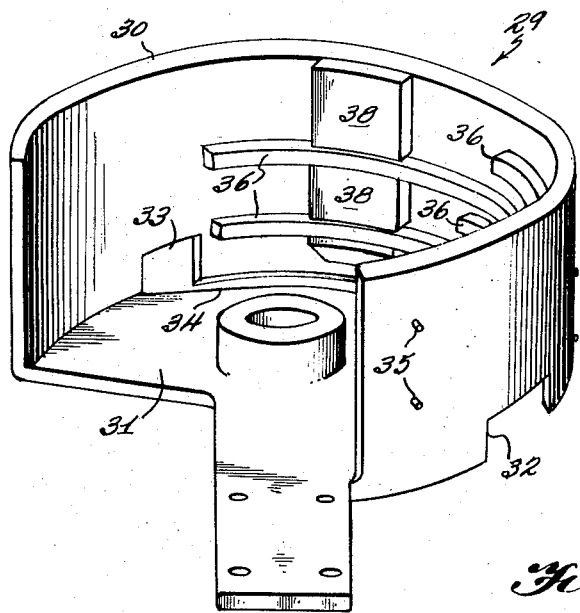
Fig. 7.
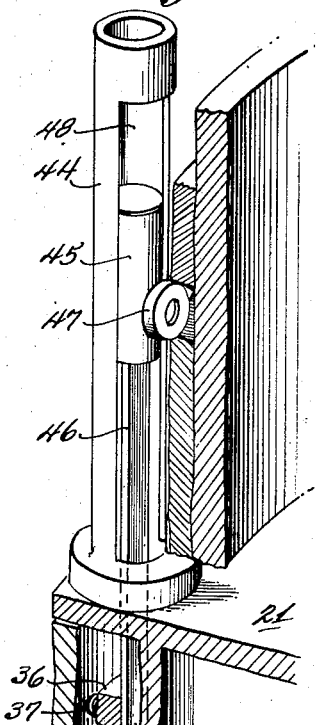
Fig. 8.
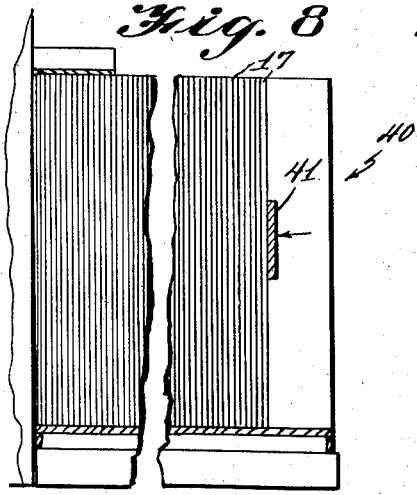
Fig. 9.
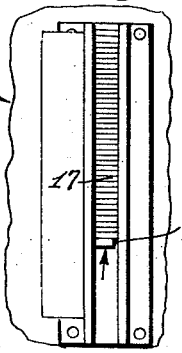
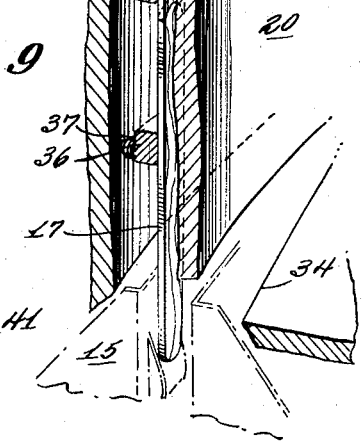
INVENTOR
ROBERT T. GLASS
BY Beale and Jones
ATTORNEYS

2,892,423
CONFECTION MACHINES

Robert T. Glass, Austin, Tex.

Application July 22, 1957, Serial No. 673,448

7 Claims. (Cl. 107—8)

One object of this invention is to provide improved apparatus for inserting sticks into confections as the same are being carried in molds by a conveyor chain in continuous, uninterrupted motion. Another object of the invention is to provide apparatus for inserting sticks in soft confections preparatory to freezing the latter, the confections being in molds carried by and spaced along a continuously moving conveyor chain, each mold having a stick holder above it carried by said chain for holding the stick in the confection during the freezing operation.

The above and other objects of my invention will be apparent from the following description and from the appended drawings wherein:

Fig. 3 is a top plan view of the stick inserting apparatus shown in Fig. 1, omitting the conveyor;

Fig. 4 is a horizontal section taken substantially on line 4—4 of Fig. 1, omitting the conveyor but indicating movement with dot and dash lines;

Fig. 5 is a fragmentary vertical section of the apparatus showing a stick being inserted into a stick holder and into the mold thereunder;

Fig. 6 is a perspective view of a portion of the apparatus;

Fig. 7 is a fragmentary view in perspective, similar to that shown in Fig. 5, at a different point in the operating cycle;

Fig. 8 is a fragmentary view showing in vertical section a magazine for inserting sticks to my apparatus; and Fig. 9 is a fragmentary plan view of the device as shown in Fig. 8.

Figure 1:
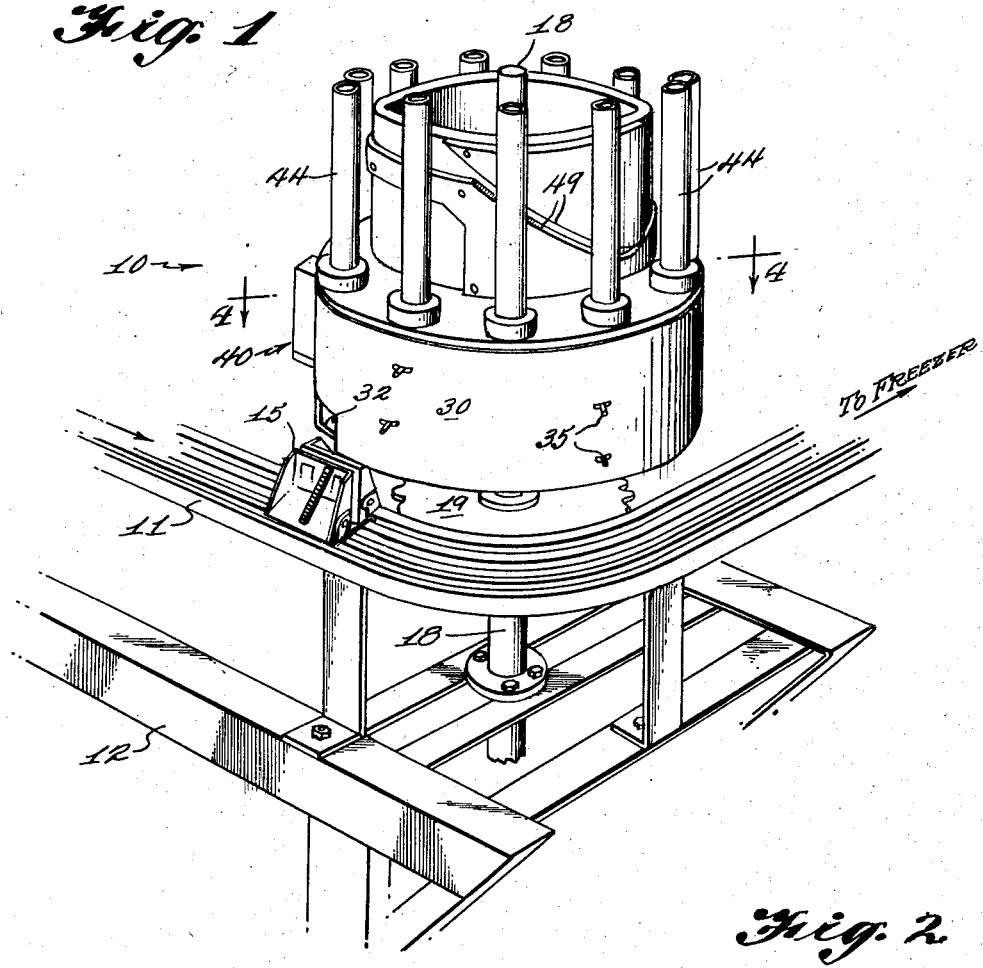
Fig. 1 is a perspective view of an apparatus made in accordance with my invention operatively disposed with respect to a conveyor which moves the confectionary molds past it, only one stick holder being shown on the conveyor entering the operative space under the stick inserting apparatus.
Figure 2:
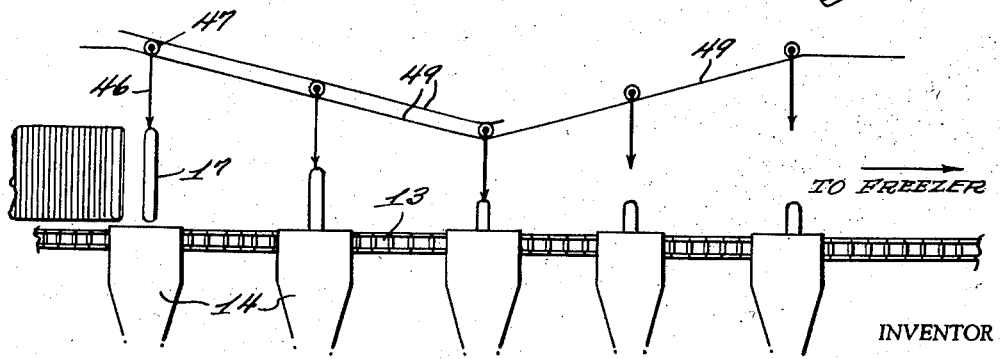
Fig. 2 is a schematic view illustrating the operation of my apparatus.

Referring now to the drawings, wherein like characters designate the same or similar parts, there is shown a stick inserter made in accordance with my invention, generally designated 10, mounted adjacent conveyor guide structure 11 above supporting structure 12 on the inner side of a 90° bend in the conveyor. Spaced along a conveyor chain 13, as illustrated schematically in Fig. 2, and carried thereby are a plurality of molds 14. Attached above each mold 14 is a stick holder 15, only one of which is illustrated in Fig. 1 and all of which are omitted in Fig. 2. Each stick holder has opposed stick receiving and retaining members 16—16' for receiving and holding in proper relation to the mold a stick 17 when inserted downwardly, as illustrated in Fig. 5. Preferably, member 16' is a resilient spring and opposed members 16 are stiff supports integral with and struck out from holder 15.

Rotatably mounted in supporting structure 12 is a vertical sprocket shaft 18 to which is fixed the sprocket wheel 19 which operatively engages conveyor chain 13 along the inner bend of the conveyor chain. Shaft 18 may be a drive shaft for moving conveyor chain 13. A cylindrical drum 20 having an integral top plate 21 is also fixed to shaft 18 so as to rotate therewith. Angularly spaced around the outer cylindrical face of drum 20 are a plurality of vertical slots 22 each shaped so as to receive a single stick 17 with the outer surface of the stick projecting outwardly beyond the face of drum 20 slightly as illustrated at 23 in Fig. 5.

Referring to Fig. 4, conveyor chain 13 follows a path under drum 20 and around sprocket wheel 19 indicated by line 24—25, carrying molds 14 and stick holders 15 along a parallel line 26—27 which is substantially tangent to the outer surface of drum 20. Thus, throughout a fixed angle 28, the outer surface of drum 20 is directly above the centers of the molds 14 and stick holders 15 moved by conveyor chain 13. Since drum 20 and sprocket wheel 19 are rigidly attached to the same shaft 18, and since sprocket wheel 19 operatively engages chain 13, there is no relative movement between the outer face of drum 20 and molds 14 and stick holders 15 throughout the fixed angle 28. Slots 22 are spaced along the face of drum 20 so that each slot is directly above the center of a mold 14.

Partially surrounding and underlying drum 20 is biased stick retaining means generally designated 29, shown separately in Fig. 6. This comprises a cylindrical shell 30 having a lower plate 31 rigidly attached to fixed structure 12 by means not shown. A suitable entrance opening 32 and exit opening 33 with connecting opening 34 is provided in structure 30—31 for the passage of stick holders 15. Floatingly mounted by means of pins 35 on the inner side of shell 30 are a plurality of horizontally disposed curved retainer strips 36 urged inwardly toward drum 20 by springs 37. Each strip 36 has a pair of pins 35 extending from its rear, one near each end. Each pin extends through an aperture in shell 30, one aperture for each pair of pins being horizontally slot-shaped, to allow the curved strip to move in and out. Suitable guides 38 fixed to shell 30 assist in holding strips 36 in proper vertical positions. Thus, inwardly biased retaining strips 36 hold sticks 17 resiliently in slots 22 until said strips are pushed downwardly by means to be described below.

Although not essential, in the preferred form of my invention I provide outwardly spring-biased balls 22' in each slot 22 to urge each stick 17 outwardly against retaining strips 36. This assists in holding irregular strips or thin strips in the slots. I prefer to provide one such ball 22' in the upper portion and another in the lower portion of each slot.

Referring now to Figs. 4, 8 and 9, suitable means are provided to feed sticks 17 into successive slots 22 as drum 20 rotates in the counterclockwise direction indicated in Fig. 4. This figure illustrates the feeding of the first strip 17 into a slot 22 at point 39 by stick feeding means generally designated 40. The structure of this stick feeding means is not a part of the present invention and only the parts thereof necessary to an understanding of the present invention are shown, comprising a magazine which is kept supplied with a stack of sticks which are urged toward drum 20 by a follower 41 so that each slot 22 is supplied with a stick 17 as it rotates past stick feeding means 40. As mentioned above, Fig. 4 illustrates the feeding of the first stick into a slot 22. For this reason, retainer strips 36 in this figure bear directly against drum 20, whereas after the operation is in process strips 36 are held away from drum 20 by sticks 17 or the plungers 46 to be described below.

Means are provided for pushing each stick 17 downwardly into stick holder 15 and mold 14. In top plate 21 of drum 20 directly above each slot 22 is an aperture 43. Mounted on top plate 21 over each aperture 43 is a vertical plunger guide or cylinder 44 in which there is a plunger piston 45. Extending downwardly from each plunger piston 45 is a plunger 46 having substantially the same cross sectional area as each stick 17 and being in alignment with a stick 17 held in said slot. A follower 47 mounted on each piston 45 extends outwardly through an opening 48 in cylinder 44 and operatively engages fixed cam surfaces 49 mounted on a cylinder which is rigidly fixed against motion by means not shown. Thus, as drum 20 rotates, carrying with it plunger cylinders 44 and followers 47, plungers 46 force sticks 17 down into molds 14 as illustrated schematically in Fig. 2. The stick retainers 15 are not shown in Fig. 2, but Fig. 7 shows the relationship of the parts near the beginning of the downward movement plunger 46, and Fig. 5 shows the relationship of the parts substantially at the end of the downward movement.

The operation of my improved apparatus will be apparent from the foregoing description. As drum 20 rotates counterclockwise in synchronism with conveyor chain 13, each slot 22 is supplied with a stick 17 by stick feeding means 40. Throughout the fixed angle 28 the sticks are held in registry with the respective stick holders 15 and molds 14 being moved through the same angle by chain 13. While rotating through this angle cams 49, acting through followers 47, push plungers 46 downwardly as illustrated by the first three positions shown in Fig. 2, thereby inserting the sticks into the molds, and into the stick holders (not shown in Fig. 2). Cam 49 then lifts the plungers to position for the next cycle, as illustrated by the last two positions in Fig. 2.

Thus it will be seen that I have provided novel and improved stick inserting mechanism which is particularly well adapted for use on machines which produce frozen confections on sticks, and that the machines on which the apparatus is used may be of the continuously moving type; i.e., the machine need not be stopped momentarily for the insertion of each stick. In the single embodiment illustrated the fixed angle in which the stick-inserting operation is performed is 90 degrees, but the apparatus may be designed for performing the operation in lesser or greater angles.

Various embodiments within the scope of the appended claims will be apparent to those skilled in the art.

I claim:

1. A stick inserter for placing sticks in confections, said confections being in molds carried by and spaced along a conveyor chain, comprising a sprocket shaft, a sprocket wheel fixed to said shaft operatively engaging said chain along a circular section of its path lying within a fixed angle around the axis of said shaft, a cylindrical drum fixed to said shaft adjacent said circular path section, said drum having spaced slots in its outer cylindrical face, each said slot being shaped to receive one of said sticks and being alined with one of said molds throughout the travel of the latter through said angle, said drum being so oriented that said sticks are not naturally retained by gravity in their respective slots throughout their travel through said angle, means for feeding a stick into each successive slot before the rotation thereof into said angle, biased stick retaining means mounted on fixed structure around said drum, said retaining means being disposed along the rotational path of travel of said sticks with said drum and being biased against sticks disposed in said slots, and means to push said sticks along said slots into said confections while said sticks are rotating through said angle.

2. A stick inserter for placing sticks in confections, said confections being in molds carried by and spaced along a conveyor chain, comprising a sprocket shaft, a sprocket wheel fixed to said shaft operatively engaging said chain along a circular section of its path lying within a fixed angle around the axis of said shaft, a cylindrical drum fixed to said shaft adjacent said circular path section, said drum having spaced slots in its outer cylindrical face, each said slot being shaped to receive one of said sticks and being alined with one of said molds throughout the travel of the latter through said angle, said drum being so oriented that said sticks are not naturally retained by gravity in their respective slots throughout their travel through said angle, means for feeding a stick into each successive slot before the rotation thereof into said angle, biased stick retaining means mounted on fixed structure around said drum, said retaining means being disposed along the rotational path of travel of said sticks with said drum and being biased inwardly against sticks disposed in said slots, outwardly biased stick retaining means in each said slot urging said sticks outwardly against said first-named stick retaining means, and means to push said sticks along said slots into said confections while said sticks are rotating through said angle.

3. A stick inserter for placing sticks in soft confections preparatory to freezing the same, said confections being in molds carried by and spaced along a conveyor chain, each said mold having a stick holder above it carried by said chain for holding a stick in said confection during freezing, comprising a vertically disposed sprocket shaft, a sprocket wheel fixed to said shaft operatively engaging said chain along a circular section of its path lying within a fixed angle around the axis of said shaft, a cylindrical drum fixed to said shaft above said stick holders, said drum having spaced slots in its outer cylindrical face, each said slot being shaped to receive one of said sticks and being alined with one of said stick holders throughout the travel of the latter through said angle, means for feeding a stick into each successive slot before the rotation thereof into said angle, biased stick retaining means mounted on fixed structure around said drum, said retaining means being disposed along the rotational path of travel of said sticks with said drum and being biased against sticks disposed in said slots, and means to push said sticks down said slots into aid stick holders while said sticks are rotating through said angle.

4. A stick inserted in accordance with claim 3 having, in combination, outwardly biased stick retaining means in each said slot urging said sticks outwardly against said first-named stick retaining means.

5. A stick inserter in accordance with claim 3 wherein said biased stick retaining means comprises a fixed shell around a portion of said drum, horizontally disposed curved retainer strips mounted on the inner side of said shell for movement toward and away from said drum, and spring means urging said strips against sticks disposed in said slots.

6. A stick inserter in accordance with claim 3 wherein said means to push said sticks down said slots into said stick holders comprises: for each said slot a plunger cylinder mounted on said drum above said slot, a plunger piston slidable in said cylinder, a plunger fixed to said piston and alined with said slot to engage a stick therein, said cylinder having an opening along one side, and a follower on said piston extending through said opening; and a fixed cam operatively engaging said respective followers to push the respective sticks downwardly in succession as said drum rotates.

7. A stick inserter for placing sticks in confections, said confections being in molds carried by and spaced along a conveyor chain, comprising a sprocket shaft, a sprocket wheel fixed to said shaft operatively engaging said chain along a circular section of its path lying within a fixed angle around the axis of said shaft, a cylindrical drum fixed to said shaft adjacent said circular path section, said drum having spaced slots in its outer cylindrical face, each said slot being shaped to receive one of said sticks and being alined with one of said molds throughout the travel of the latter through said angle, said drum being so oriented that said sticks are not naturally retained by gravity in their respective slots throughout their travel through said angle, means for feeding a stick into each successive slot before the rotation thereof into said angle, resiliently biased stick retaining means associated with each said slot during the travel thereof throughout said angle, and means to push said sticks along said slots into said confections while said sticks are rotating through said angle.

References Cited in the file of this patent
UNITED STATES PATENTS

| | | |
|---|---|---|
| 1,617,371 | Buckmiller | Feb. 15, 1927 |
| 1,960,456 | Robb | May 29, 1934 |

UNITED STATES PATENT OFFICE

CERTIFICATE OF CORRECTION

Patent No. 2,892,423                                         June 30, 1959

Robert T. Glass

It is hereby certified that error appears in the printed specification of the above numbered patent requiring correction and that the said Letters Patent should read as corrected below.

Column 4, line 47, for "aid stick" read -- said stick --; line 49, for "inserted" read -- inserter --.

Signed and sealed this 1st day of December 1959.

(SEAL)
Attest:

KARL H. AXLINE
Attesting Officer

ROBERT C. WATSON
Commissioner of Patents